April 4, 1939.  W. S. H. HAMILTON  2,153,247
ELECTRIC LIGHT AND POWER SYSTEM
Filed Dec. 10, 1937  6 Sheets-Sheet 1

INVENTOR.
William S. H. Hamilton,
BY
ATTORNEY

REISSUED

Patented Apr. 4, 1939

SEP 1- 1942

2,153,247

UNITED STATES PATENT OFFICE 2,153,247

ELECTRIC LIGHT AND POWER SYSTEM

William S. H. Hamilton, Larchmont, N. Y., assignor to The New York Central Railroad Company, a corporation of New York Application December 10, 1937, Serial No. 179,209

23 Claims. (Cl. 171—97)

This invention relates to electric light and power systems for railway trains, and particularly to means for generating and supplying electricity for electric lighting and power purposes on the locomotives and cars of passenger trains. The invention is directed particularly to supplying current of varied and required voltages for the lighting of the train, for charging storage batteries, and for furnishing power to operate fans, air conditioning compressors and other power driven appliances used as parts of equipment on locomotives and cars of railway passenger trains.

One object of the invention is to supply any number of cars with current from one car which can be located at any point in the train.

A further object of the invention is to provide a simple, reliable and efficient system of this character whereby a desired number of high and low voltages may be secured and properly apportioned to lights and operating appliances, and whereby regulation and control of the current supply and operation of appliances is automatically effected.

A still further object of the invention is to provide means whereby the system may also be manually controlled according to service requirements.

A still further object of the invention is to provide a novel operation of transformers for obtaining different current voltages for operation of working sets or devices.

A still further object of the invention is to provide means for successively energizing the supply lines throughout the train for properly starting into action and keeping in action working parts while keeping the contacts of couplers at the head and rear ends of the train inactive while all others are kept active.

A still further object of the invention is to provide means for a desired sequential and preferential operation of air conditioning compressors.

A still further object of the invention is to generally simplify and improve and increase the efficiency of light and power systems of this character and to provide a system which is not subject to derangement or failure.

With these and other objects in view, which will appear in the course of the subjoined description, the invention consists in the novel construction, combination and arrangement of parts hereinafter fully described and claimed and exemplificatively illustrated in the accompanying drawings, in which:—

In these drawings the cars are shown with circuits deenergized and with commutating switches S2 in 440V position, and therein the interlocks, contacts and operating coils of the same devices are designated by the same reference characters.

The system illustrated consists of a power car PC and three passenger carrying cars which may be either coaches, diners or sleepers, or other passenger or baggage cars, designated PC—1, PC—2, PC—3, together with appropriate power bus lines A, B and C, running throughout the train.

On the power car are two generators G with exciters E each of which may be driven by a Diesel engine. These generate power at 440 volts, 3 phase, which is supplied to the bus lines A, B and C. Voltage regulators VR operate in connection with the exciters to maintain a generator voltage of predetermined value.

In addition two coupler sockets CS are provided on the power car to receive power from an outside source at 440 volts, 3 phase, in case the generators are shut down.

The 440 volt, 3 phase power is distributed through the cars by means of the three bus lines A, B and C. The couplers T—L—C between cars are of a suitable tight-lock type with automatic slack or lost motion between cars except the usual draft movement and with which are combined train line connections which automatically make all steam, air and electric connections upon impact of coupling and break the connections upon uncoupling. In order to allow the cars to be assembled in any possible combination and end to end position, the coupler contact plugs C—P are in duplicate at each end as shown.

In addition to the 440 volt bus lines, two battery bus lines are shown marked B+ and B—. These are of relatively heavy capacity and run through the train.

In addition to the aforesaid lines there are also control lines designated 1 to 8, inclusive. These control lines have cutout switches S' in them near the coupler contact plugs CP which are connected to the coupler mechanism in such a way that before a car can be uncoupled the switches S' at that particular coupler position have to be opened, and hence the wires are dead when the coupler is uncoupled.

Cutout switches are not provided in the 3 phase, 440 volt bus lines nor the battery bus lines, but the same result is accomplished in another manner, as hereinafter explained.

On the power car is provided a single phase transformer T' and on each car except the power car are provided three single phase transformers T—1, T—2 and T—3 which serve the dual purpose of providing 30 volts for A. C. lighting and also, by means of a tap at the mid-points of their primaries, supply 220 volt, 3 phase power for operation of the motor generator sets MG. The 30 volt secondaries of the lighting transformers are connected to the relays designated as LR—1, CR—2 and LR—3 which control the power to the lights, it being the intention to supply all the lights from A. C. power when available and to supply the greater portion of the lights from D. C. from the battery on each car when A. C. power is not available. The relationship between the number of lights used on A. C. and on A. C./D. C. will depend on the uses to which the car is put, and the importance of preserving full lighting at all times. The arrangement and uses of the A. C. and D. C. lights are hereinafter specified.

Transformers T—1, T—2 and T—3 have the further function of supplying 440 volts to the bus line on that individual car whenever power is being supplied from the 220 volt source. This energizes transformers T—4, T—5 and T—6 at their normal voltage.

On each car except the power car there are also shown transformers T—4, T—5 and T—6 which have 110 volt secondaries for the purpose of supplying A. C. power at a standard voltage of 110 to portable devices, such as vacuum cleaners, radio sets, toasters, etc. These transformers may or may not be installed depending on the uses to which the individual cars are put.

Each car is provided with a battery B (assumed of 16 cells lead acid type) which is arranged to be charged by a motor generator set MG consisting of a 220 volt, 3 phase motor and D. C. generator with voltage regulator VR'. Reverse current relay of a conventional type, indicated by R, is also provided. As the lamps are never connected to the battery while the motor generator set is running, it is possible to omit the lamp regulator ordinarily used with axle lighting equipments. The motor is adapted to be run on 220 volts, 3 phase current supplied either from primaries of transformers T—1, T—2 and T—3 or from the A. C. supply at 220 volts which may be plugged in on each car as indicated by a 220 volt coupler socket CS'.

Instead of using motor generator sets, rectifiers may be used for charging the batteries if desired.

The air conditioning compressor on each of cars PC—1, PC—2 and PC—3 is provided with a motor CM capable of operating from either 220 or 440 volts. An electromagnetically operated commutating switch S2, automatically controlled, is provided to connect the compressor motor to either the 440 volt, 3 phase bus line or the 220 volt, 3 phase coupler socket.

The 220 volt power supply is provided on each car by means of a coupler socket CS' as shown for the purpose of enabling any car when disconnected from the train to be connected to a 220 volt, 3 phase, A. C. supply, this being a standard power supply generally available.

The control circuits on the power car are operated from the battery through two control switches S3, S4, one intended to control the power in the car itself and the other, those connections which supply power to the bus lines throughout the train. Control switches are shown controlling the generator contactors and also the coupler plug contactors. It is intended that either one or both generators can be operated as desired depending on the load.

Overload relays OLR1—OLR4, inclusive, are provided to function whenever either generator or 440 volt coupler socket CS is overloaded.

Relays X1 and X2 operate in connection with the control system and are referred to later in connection with the circuit operations.

The control circuits that control the power supply through the bus line to the other cars PC—1, PC—2, PC—3 are the same as on the other cars and will be described in association with other elements thereon.

Car PC—1 may be taken as typical. It will be noted that a control switch S4 is provided to control all the circuits on that car which connect to the bus lines or outside power supply, in such a manner that opening of this switch will disconnect the entire power supply system. When the cars are connected together and to the power car and the 440 volt 3 phase bus in the power car is energized, the potential relays PR—1 and PR—2 in the power car pick up and energize the operating coils of an electro-pneumatically operated 3 phase contactor AC—2 in the power car and also a corresponding coil of contactor AC—1 on car PC—1. The closure of contactor AC—2 on the power car and contactor AC—1 on car PC—1 energizes the bus line on PC—1 and causes potential relays PR—1 and PR—2 on car PC—1 to pick up and energize operating coils AC—2 on car PC—1 and AC—1 on car PC—2, in turn closing their respective contactors and energizing the bus on car PC—2.

It will thus be noted that each car will be energized successively. When the power reaches the rear of car PC—3 or whatever car is the rear car of the train, the magnet valve of contactor AC—2 on that car will not be energized on account of the circuits through the coupler socket being open. Therefore contactor AC—2 on rear car PC—3 or whatever car is the rear car of train will remain open and the main power contacts in the coupler will be dead.

The control circuits of contactor AC—1 on car PC—1 are also duplicated in relation to contactor AC—2 on the power car, in order that no matter from which direction the power is coming, the functioning of the contactors will be the same. The same duplication is provided on the other cars for this purpose.

Potential relays PR—1 and PR—2 are duplicated to insure greater reliability, but so far as functioning is concerned either is ordinarily sufficient.

It will also be noted that interlocks are provided on contactor AC—3 to prevent energization of the 440 volt bus line while power supply is being received from 220 volt coupler socket.

The battery bus line contactors B—1 and B—2 are operated in a similar manner to the power bus line contactors AC—1 and AC—2 except that their interlocking is simpler.

The control circuits on cars PC—1, PC—2, PC—3 are identical except for certain features related to the load control system which will be later described.

Each compressor is controlled primarily by means of a thermostat marked T$h$ which will close its contacts when it is desired to start the compressor and open them to stop it. It will be noted that this thermostat controls relay R—4 which relay is used to permit circuits to be closed in connection with either the 440 volt or the 220 volt power supply. When the 440 volt supply is available and the 220 volt supply is disconnected, the commutating switch in the compressor circuit which is assumed to be electro-pneumatically operated by magnet valves CS—440 and CS—220, will automatically throw to the 440 volt position in which it is shown and permit control power to be fed to the interlocks that control the compressor contactor C—1.

On account of the characteristics of the 3 phase motors driving the compressors, it is necessary to start the compressors one at a time to prevent overloading the generators. It is therefore necessary to provide an arrangement for sequential starting and this is accomplished by means of relays R—1, R—3 and time delay relay AG1. The time delay relay AG1 may be of any of the electro-magnetic or electro-thermal types of relays suitable for introducing a time interval in electrical circuits, said device having a switch controlled by the energization and deenergization of a magnet and governed in such manner as to effect switching operations between sets of contacts with a time delay period.

With the compressor shut down if the thermostat contacts T$h$ close, calling for the compressor to run, relay R4 is energized which closes the circuit between train wires 6 and 8. Closure of this circuit energizes relay X1 in the power car (assuming that no overloads exist on the generators) and this relay in turn energizes wire 5 in the power car and 5—A on car PC—1. Wire 5—A being energized, energizes coil R1 of a double coil relay whose other coil is R2. Picking up of relay R1 energizes coil of time delay relay AG1 and also through contact of time delay relay AG2 the coil of compressor contactor C1. Time delay relay AG1 is arranged so that its contacts reverse from the position shown on the drawings, in approximately fifteen seconds after the coil is energized.

The time interval between the energization of coil AG1 and the changing of its contacts is sufficient to permit the compressor motor CM to start and the peak of the starting current to be passed.

As soon as the contacts on AG1 reverse, they close the circuit to the coil of relay R3, and relay R3 closing, completes the circuit between train wires 5A and 5B on car PC—1. Picking up of relay R3 also breaks the circuit between train wires 6 and 8, so that unless other cars are calling for compressors to start, relay X1 will drop out. If other cars are calling for compressors to start, the operation of the relays and compressor contactors will be the same on each succeeding car until the end of the train is reached when the circuit between train wires 6 and 8 will be broken as soon as relay R3 on car PC—3 picks up. The system will then return to the condition in which it is ready to start again.

It should be noted, however, that on those cars where the compressor is running, time delay relay AG1 will be retained picked up with the coil energized and the contacts reversed from the position shown on the drawings, holding relay R3 closed so that no time delay will occur in passing current through those cars to allow the compressors to start on succeeding cars, when any car calls for its compressor to start by the closing of relay R4.

The time required for AG1 to pick up is also eliminated if the compressor is not to be started on a car. In that case relay R4 will not be picked up and its contacts between contacts R1 and coil of R3 cause relay R3 to pick up immediately without waiting for contacts of AG1 to close. This connection is not provided on car PC—2 on account of the different circuits for relay R4 used thereon.

The foregoing describes the sequential starting of the compressors when the power supply at the head end is ample to supply all compressors. In case a generator should fail enroute, however, it is desirable to give the cars some air conditioning, even though it may not be of maximum degree, without overloading the remaining generator. It is also desired to distribute this air conditioning among the cars so as to prevent the compressors running all the time on some of the cars and not at all on the others. These results are accomplished by the provision of a load limit control system which operates as follows:

Whenever one of the generators is overloaded as indicated by the picking up of one of the overload relays OLR1 or OLR2 on the power car PC this in turn deenergizes the circuits feeding the coils of relays X1 and X2 on the power car. This causes the deenergization of train wires 4 and 5. The deenergization of train wire 5 prevents any further compressors from starting since relay R1 cannot pick up.

Deenergization of train wire 4 causes load limit relays L to open on all three cars. (On car PC—2 this does not effect the compressor circuits and hence may be disregarded here.) It will be noted on cars PC—1 and PC—3 that the operating coils of two additional time delay relays AG2, AG3 are connected in multiple with the coil of contactor C—1. AG2 is designed to open its contacts (shown closed) ten minutes after its coil is energized. AG3 is designed to open its contacts (shown closed) as soon as its coil is energized and to close them again two minutes after its coil is deenergized.

With the connections of the contacts of AG2, and L as shown on cars PC—1 and PC—3 the opening of contacts L will open the circuit to coil C—1 immediately if C—1 has been closed for ten minutes or more due to contacts AG2 being open. If C—1 has not been closed for ten minutes it will remain closed until expiration of this time due to contacts AG2 remaining closed until then.

Relay R4 is prevented from closing again until contacts AG3 close which occurs two minutes after the compressor is shut down.

The result of this arrangement is that when the load limit control is functioning as shown by the opening of relay contacts L, any individual compressor on cars such as PC—1 and PC—3 is allowed to run only for ten minutes from the time it started and then is compelled to stay shut down until at least two minutes have elapsed. This interval gives other compressors an opportunity to start and hence distribute the cooling among all the cars affected.

In the case of a long train it might be desirable during the load limiting condition to give preferential treatment to cars, such as diners and observation cars, and permit them to have full cooling irrespective of the other cars in the train. The circuits on car PC—2 have been arranged to show such a preferential operation. This is obtained by contacts C—1, C—2 and R4 between train wires 7 and 8. When relay R4 on car PC—2 picks up it causes relay X2 to pick up on the power car through this circuit and train wires 7 and 8. Relay X2 picking up deenergizes train wire 4 and opens relays L on cars PC—1 and PC—3. Opening of relays L opens the pick up circuit of relays R4 on any cars on which the compressors have not started. This prevents any compressors from starting on cars not equipped with preferential control and causes the relays R1, R2 and AG1 on such cars to drop out, which in turn permits them to start picking up again to close R1 on car PC—2.

Picking up of relay X2 and opening of relay L also causes compressors on cars PC—1 and PC—3 to start cycling (ten minutes on, two minutes off) as described in connection with the load limit control operation. This cycling is necessary if the load is at or near the limit set by the overload relays in order to be sure of getting the compressor on a preferential car started quickly after the thermostat on that car calls for cooling.

The cycling is unnecessary when the load on the system is low, but cannot be avoided unless another relay is used. Relay L performs the dual functions of load limit control and of assisting in the preferential control.

It will be noted that the compressor control circuits on car PC—2 do not include time delay relays AG2 and AG3 so that once the compressor on one of these preferential cars has started, it can continue to run so long as the thermostat keeps it running, while the other cars are forced to cycle (ten minutes on, two minutes off) during a period of load limit control in order to reduce the load on the generator.

All cars are equipped with interlocks L, MGS and C—1 to prevent operation of the motor generator set on any car when the load limit control is functioning and the compressor is running. This reduces the load on the power generator G by eliminating whatever power might be required for battery charging. When the compressor is not running on that car, the motor generator set is allowed to continue running once it has been started regardless of the functioning of the load limit control, this being done primarily to avoid an excessive number of starts and stops.

When operating from the 220 volt supply, connections through contacts AC—3 and C—2 are similarly arranged to shut down the motor generator set when the compressor is running.

The arrangement and uses of the lights shown will now be described.

Three amber colored pilot lights are provided on the side of the power car, one near each coupler socket CS and CS1 to indicate when the phase rotation is correct. In the car itself a group of lights marked "Control" are provided with indications as follows:

G=green=220 volt power supply connected to car.
R=red=440 volt supply connected to bus line.
W=white=load limit control not in operation.
P=purple=A. C. transfer relay LR—1 picked up and lights operating on A. C.

In addition it is intended to provide in each vestibule three pilot lights PL which indicate how far along the car circuits 440 volt power has progressed. A look at one of these indicators will tell immediately if the power supply is not being properly fed between cars.

On cars PC—1, PC—2, PC—3 an amber light will be provided on the side of the car adjacent to 220 volt coupler sockets CS1 to indicate when the phase rotation is correct.

On each car PC—1, PC—2, PC—3 are also lights marked LV intended to be located at or near a low voltage control cabinet and have the following indications:

G=green=generator of motor generator set running and charging battery.
R=red=used in connection with steam heat control, not described herein.
W=white=air conditioning compressor running.
P=purple=lights being supplied from A. C. power.

Two pilot lights marks HV are also intended for mounting at or near a high voltage cabinet in which:

G=green=power supply from 220 volt source.
R=red=power supply from 440 volt bus line.

The vestibule pilot lights PL employed on cars PC—1, PC—2, PC—3 function in the same manner described for those on the power car.

Figure 1:
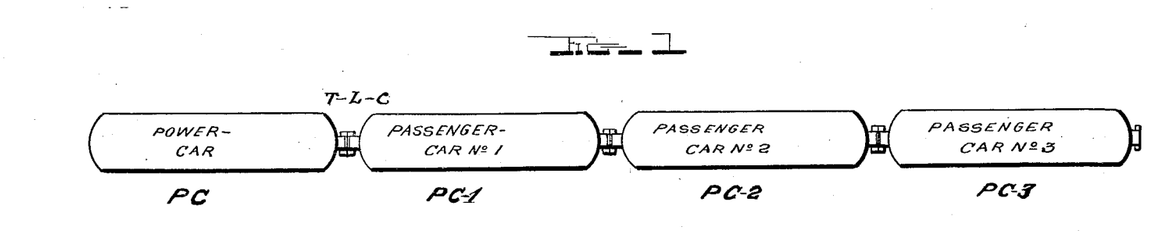
Fig. 1 is a diagrammatic plan view showing an arrangement of coupled cars embodying the invention.
Figure 2:
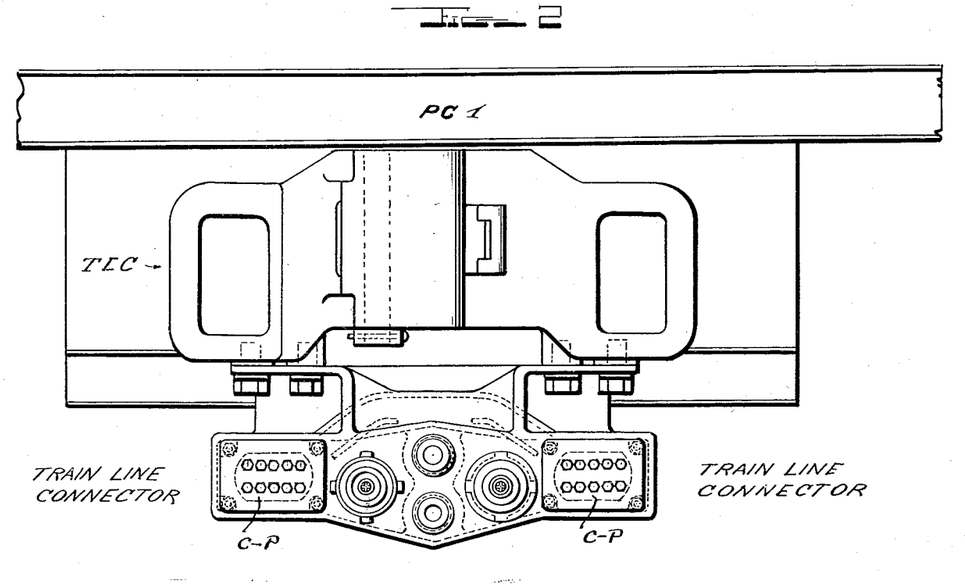
Fig. 2 is a fragmentary end elevation of one of the cars.
Figure 3:
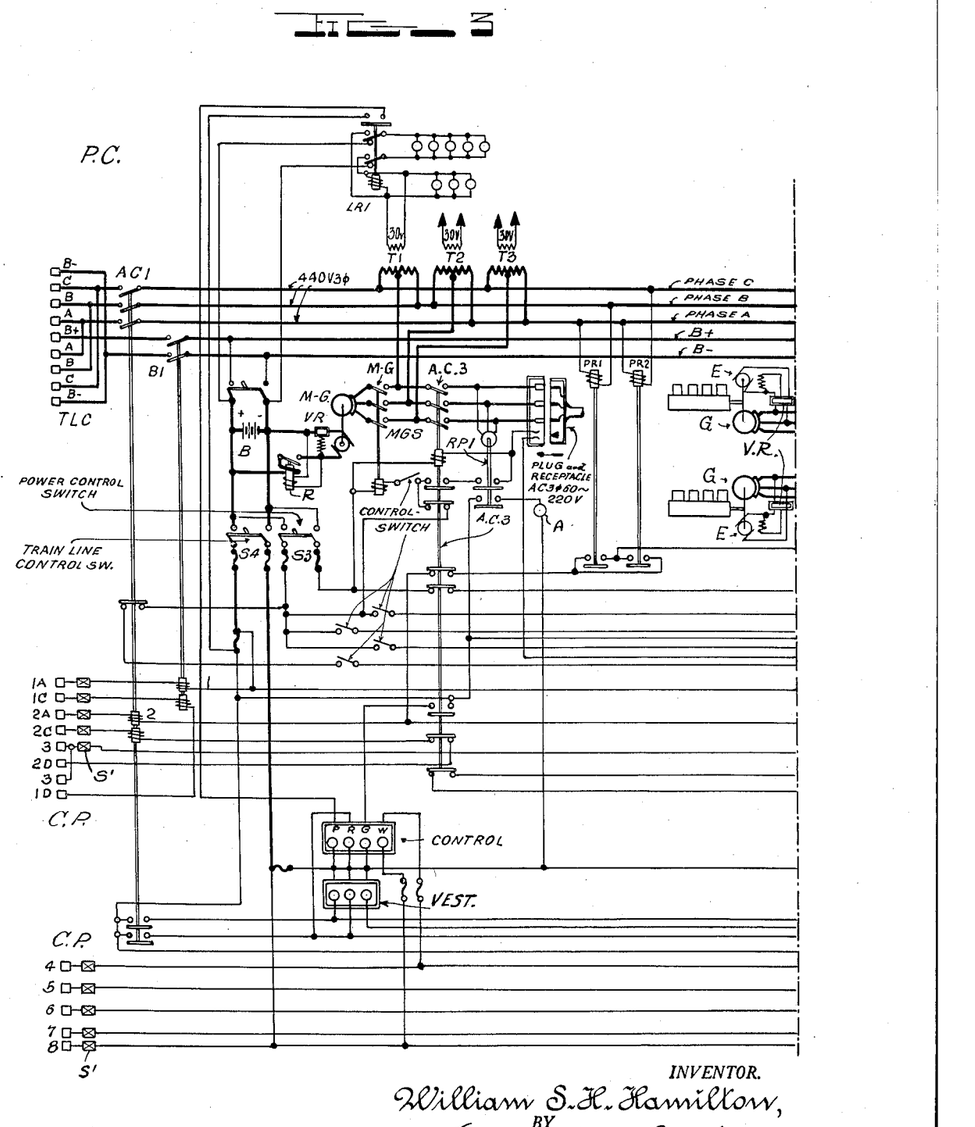
Figs. 3 and 3a are schematic diagrammatic views showing conjointly the parts used on the power car which may, for example, be the baggage car of a train.
Figure 3A:
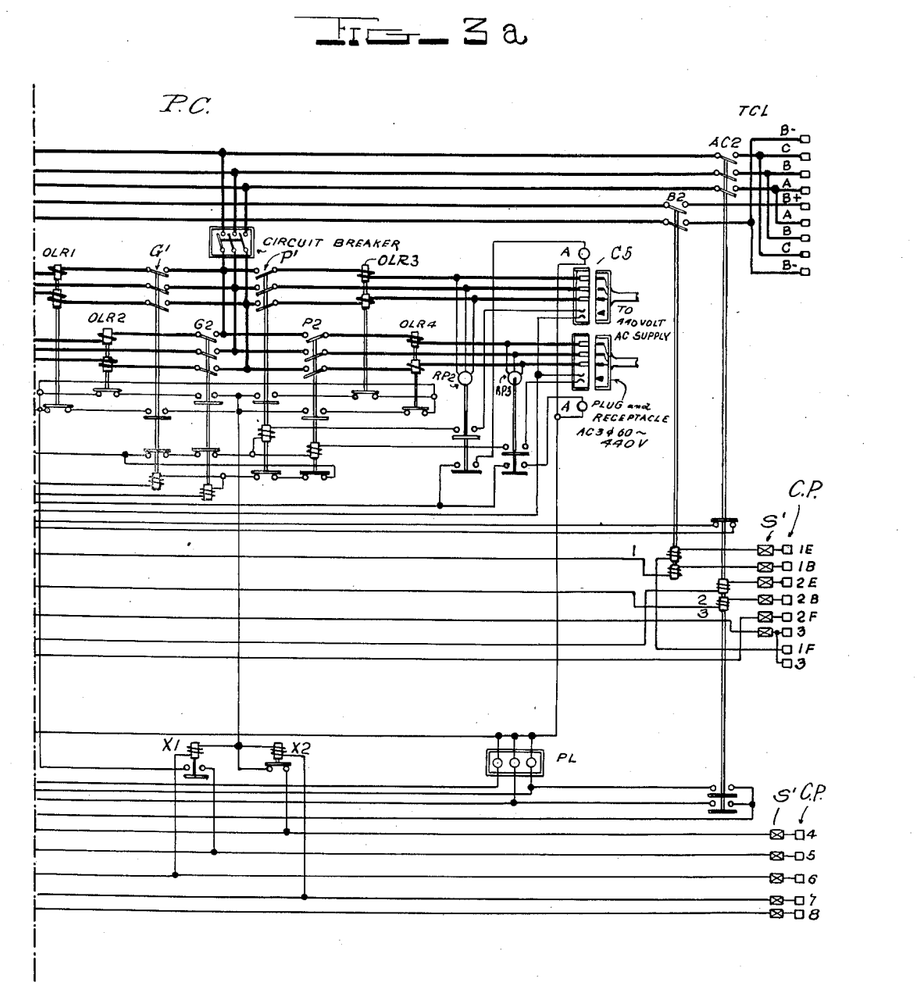
Figure 4:
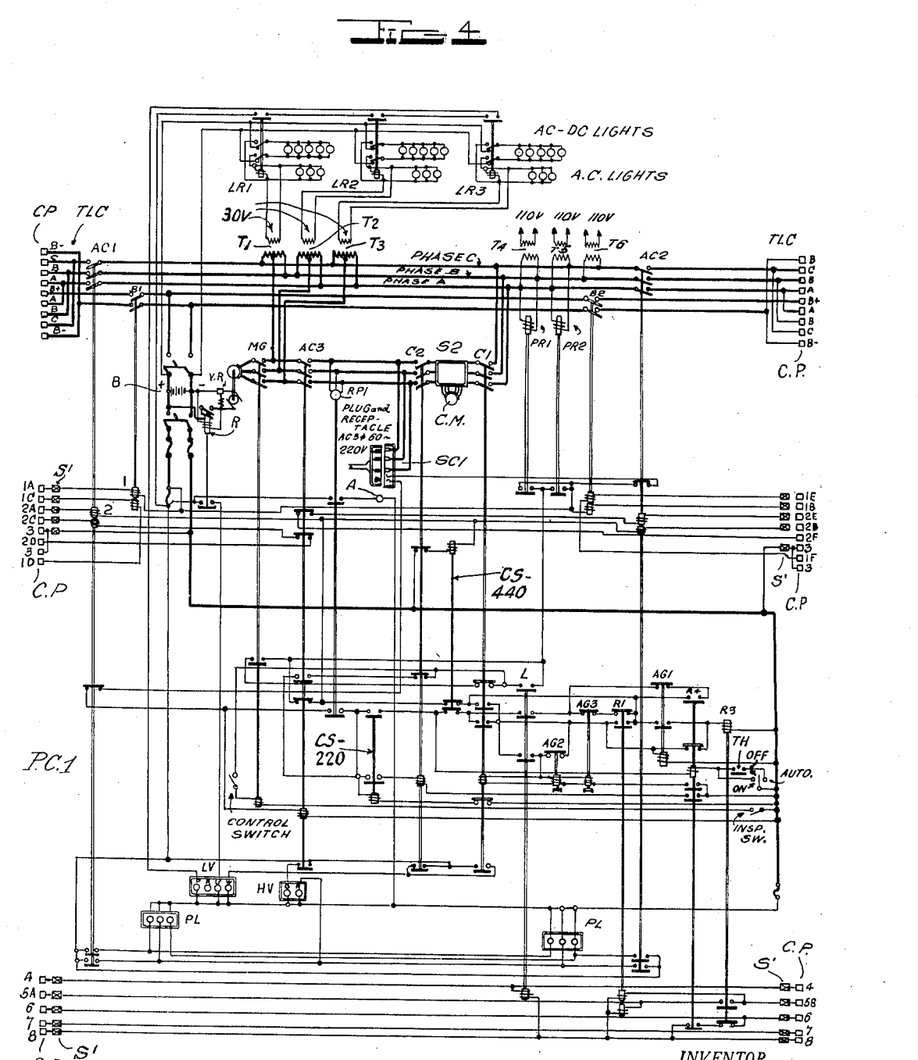
Figs. 4 and 5 are diagrams of the circuits in their proper following order used on the first and second passenger carrying cars, the circuit used on a third or succeeding passenger car being similar to that used on the first passenger car, so that with this understanding a showing of third or succeeding passenger cars thereof is unnecessary.
Figure 5:
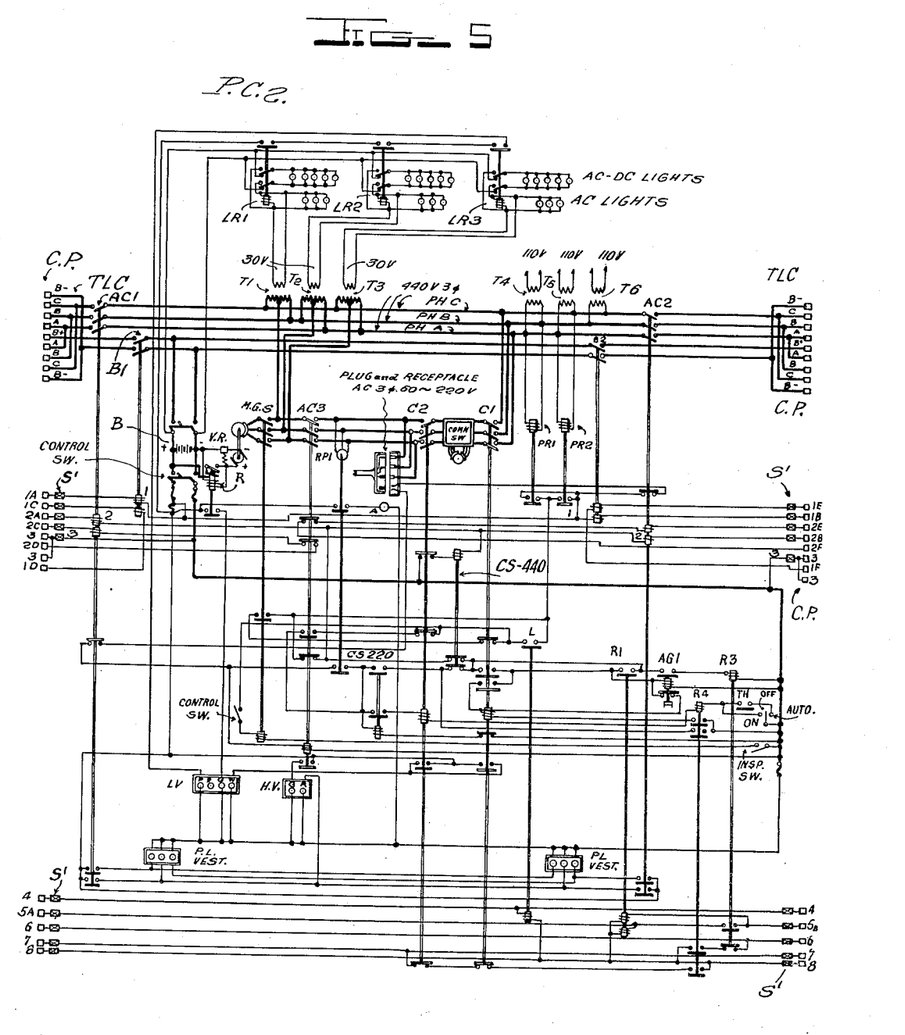
Figure 6:
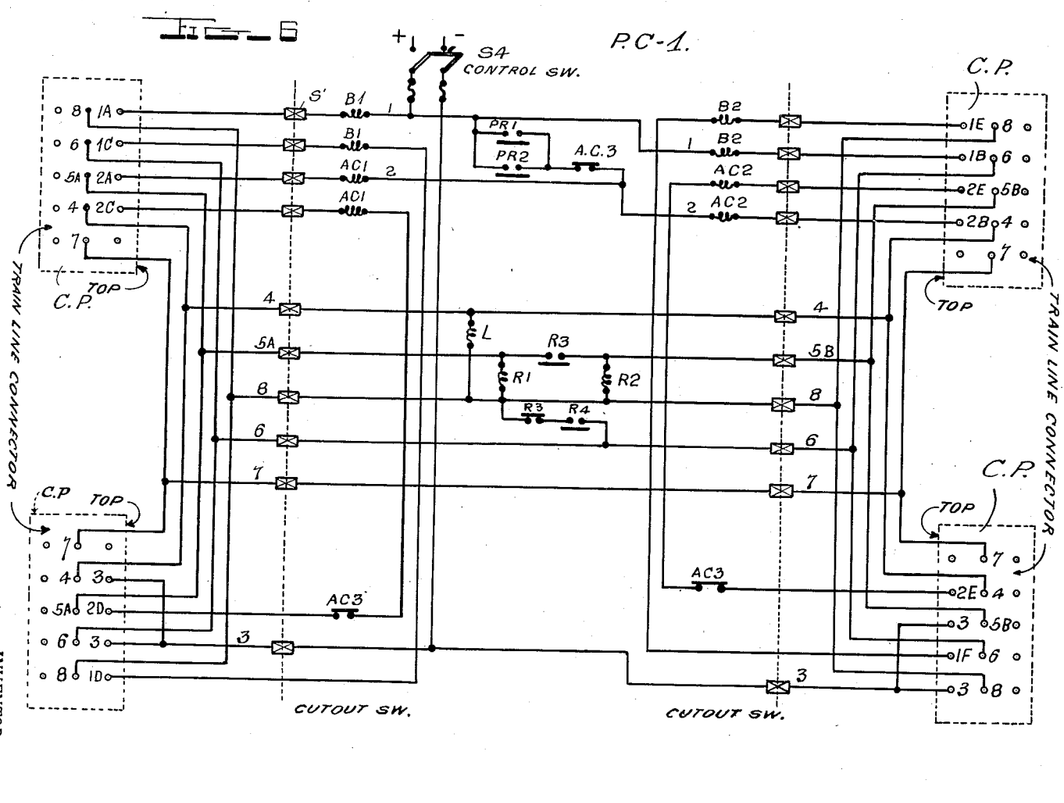
Fig. 6 is a diagram showing more particularly how the contacts are connected to the control lines so that in any combination of cars or end positions of cars relative to each other the couplers will be coupled for proper connection of the train lines and coacting operating parts.

Fig. 6 shows more particularly and in detail the arrangement of the tight lock coupler contacts to carry the connections to line wires 1 to 8, inclusive. The arrangement of the couplers and connections is such that in any arrangement or end to end position of cars proper engagement of contacts for flow of current through the wires 1 to 8, inclusive, will be effected to perform the various functions described.

It will be evident from the foregoing description that the invention provides a simple, reliable and efficient type of system for supplying current of varied and required voltages for the headlights of a locomotive and other lights of the locomotive and cars of a train, for charging storage batteries, and for furnishing power to operate fans, air conditioning compressors and other power driven appliances and utility devices used as parts of equipment on locomotives and cars of railway passenger trains. The invention also provides means whereby regulation and control of the current supply and operation of appliances is effected, for automatically energizing supply lines which are to be thrown into action, while giving manual control over the same, and cutting out those parts which are to remain inactive, such as coupler contacts at the rear end of the train during service operation of active parts. The invention further effectually takes care of overloads, provides for desired sequential and preferential operation of parts to meet service conditions, simplifies, generally improves and increases the efficiency of systems of this character and gives adequate protection against possibility of failure from derangement of parts or other causes.

While the structure shown for purposes of exemplification is preferred, it will, of course, be understood that changes in the form, construction, arrangement and proportion of parts may be made, within the scope of the appended claims, without departing from the spirit of the invention.

What I claim is:—

1. In a system for supplying electric current to a plurality of sections of a train-line conductor arranged on different cars of a train, means at the ends of the conductor sections to electrically couple the same together, a source of current supply, means for connecting the same with one of the conductor sections for energizing said conductor section, the coupling means of said conductor sections having duplicate sets of contacts arranged for properly coupling the conductors of the coupler sections in end to end relationship in any relative end to end relationship of the conductor sections, and switch devices adapted to be actuated when said conductor section is energized and the conductor sections are coupled to successively energize the other conductor sections.

2. In a system for supplying electric current to a plurality of sections of a train-line conductor arranged on different cars of a train, a source of current supply, means for connecting the same with one of the conductor sections for energizing said section, coupling means including complementary switch members for connecting the conductor sections in end to end relationship with each other to establish a circuit, and switch devices successively actuated when the first-named conductor section is energized to successively energize each following conductor section in timed order after energization of a preceding conductor section.

3. In a system for supplying electric current to a plurality of train-line conductor sections, each conductor section including power supply conductors and a power circuit supplied thereby, a source of current supply, means for connecting the same with the supply conductors of one of the conductor sections for energizing said section, complementary switch members for connecting the supply conductors of the conductor sections to establish a train-line circuit, energizing switches connected in the conductor sections for connecting power circuits with the supply conductors, and devices operating when the first-named conductor section is energized for controlling the energizing switches in regular order for successively energizing the other conductor sections.

4. In a system for supplying electric current to a plurality of train-line conductor sections, each including power supply conductors and a power circuit supplied thereby, current generating means in the system, means in one of the sections for connecting the same power supply conductors thereof with the current generating means or to an outside current source, complementary switch members for connecting the power supply conductors of the conductor sections to establish a train-line circuit, energizing switches in the power circuits of the conductor sections for connecting the same with their supply conductors, and devices actuated when the first-named conductor section is energized by its energizing switch for controlling the energizing switches of the other conductor sections to energize said other conductor sections.

5. In a system for supplying electric current to a plurality of train-line conductor sections, a source of current, complementary switch members for coupling the conductor sections to establish a train-line circuit, energizing switches connected in the respective conductor sections, and relays in the conductor sections for operating the energizing switches in the conductor sections in successive order when the sections are coupled following the energization of the energizing switch in one of the conductor sections.

6. In a system for supplying electric current to a plurality of train-line conductor sections, each including power supply conductors and a power circuit supplied thereby, a source of current, complementary switch members for coupling the conductor sections, energizing switches in the conductor sections, and relays in the conductor sections operating in predetermined order after the train-line conductor sections have been coupled to energize the energizing switches and thereby connect said conductor sections successively with the source of power.

7. In a system for supplying electric current to a plurality of sections of a train-line conductor, coupling means comprising complementary switch members having coacting sets of contacts arranged in duplicate on opposite sides of a common center line for connecting adjacent ends of the train-line conductor sections in any end to end relative arrangement of conductor sections to be coupled to establish a circuit, and control means for controlling the flow of current through said conductor sections, said control means including means for cutting off the flow of current to the contacts of a switch member at the end of a conductor section unconnected with another conductor section.

8. In a system for supplying electric current to a plurality of sections of a train-line conductor, a source of current, coupling means comprising complementary switch members having coacting sets of contacts arranged in duplicate on opposite sides of a common center line for connecting adjacent ends of the train-line conductor sections in any end to end relative arrangement of conductor sections to be coupled to establish a circuit, switch devices operated when the conductor sections are connected for successively connecting the conductor sections with the current source, and control means for controlling the flow of current to the contacts of the switch members, said control means including means for cutting off the flow of current to the contacts of a switch member at the end of a conductor section unconnected with another conductor section.

9. In a system for supplying electric current to a plurality of train-line conductor sections, coupling means at the ends of the conductor sections comprising complementary switch members provided with coacting sets of contacts arranged in duplicate on opposite sides of a common center line for connecting the conductor sections to establish a train-line circuit in any end to end relative arrangement of the conductor sections, switches connected in the conductor sections and controlling the flow of current from one to the other and to the switch members of the couplers, and means operating to actuate the coupled switch members without actuating the switch of a coupler unconnected to another coupler.

10. In a system for supplying electric current to a plurality of train-line conductor sections, a source of current supply, complementary switch members for connecting the conductor sections to establish a train line circuit, electro-magnetic energizing switches connected in the conductor sections for connecting the same with the source of current supply, and time delay relays in said sections cooperatively acting to successively and in timed order operate said switches in such manner that the operation of a preceding energizing switch will initiate an action for energization of a succeeding energizing switch.

11. In a system for supplying electric current to a plurality of train-line conductor sections, and in combination with coupling means for electrically connecting the conductor sections to establish a train line circuit, a current generator, transformers for transforming the voltage delivered by the generator into a plurality of other relatively different voltages, electro-magnetic switches connected in the conductor sections for coupling the same to the voltage sources, and relays operating when the conductor sections are electrically coupled for actuating said electromagnets to connect the conductor sections with the respective voltage sources.

12. In a system for supplying electric current to a plurality of train-line conductor sections, complementary switch members for connecting the conductor sections, sources of supply of relatively high and low voltages, transformers connected to said sources for respectively changing the higher voltage to a lower voltage and changing the lower voltage to a higher voltage, and means for applying said voltages to the conductor sections.

13. In a system for supplying current to a train-line conductor comprising a plurality of sections, one having a source of current supply, coupling means for connecting the train line conductor sections to establish a circuit, motors arranged in said conductor sections, and automatic control means for sequentially starting the motors in the conductor sections.

14. In a system for supplying current to a train-line conductor comprising a plurality of sections, coupling means for connecting the train-line conductor sections to establish a circuit, motors arranged in the conductor sections, means for controlling the flow of current through the conductor sections to operate the motors, and automatic means governed by current supply conditions for controlling the current flow to operate the motors in a certain section or sections to the exclusion of motors in one or more other sections.

15. In a system for supplying current to a plurality of train-line conductor sections, coupling members for connecting the conductor sections to establish a train-line circuit, a generator for supplying current to the conductor sections, motors in the conductor sections, and control means operating on an overload on the generator for regulating the time period of supply of current to the respective motors.

16. In a system for supplying current to a plurality of train-line conductor sections, coupling members for connecting the conductor sections to establish a train-line circuit, a generator for supplying current to the conductor sections, motors in the conductor sections, means operating when the conductor sections are coupled for sequentially starting the motors, and control means operating on an overload on the generator for regulating the time period of supply of current to the respective motors.

17. In a system for supplying electric current to a plurality of train-line conductor sections, a source of current supply, complementary switch members for connecting the conductor sections to establish a train line circuit, motors in the conductor sections, electromagnetic energizing switches connected in the conductor sections for connecting the same with the source of current supply, relays in said sections cooperatively acting to successively and in timed order operate said switches in such manner that the operation of a preceding energizing switch will initiate an action for energization of a succeeding energizing switch, and control means for sequentially starting the motors in the energized conductor sections.

18. In a system for supplying electric current to a plurality of train-line conductor sections, and in combination with coupling means for electrically connecting the conductor sections to establish a train line circuit, motors in the conductor sections, a current generator, transformers for transforming the voltage delivered by the generator into a plurality of other relatively different voltages, electromagnetic switches connected in the conductor sections for coupling the same to the voltage sources, relays operating when the conductor sections are electrically coupled for actuating said electromagnets to connect the conductor sections with the respective voltage sources, and control means for sequentially starting the motors in the energized conductor sections.

19. In a system for supplying electric current to a plurality of train-line conductor sections, complementary switch members for connecting the conductor sections, motors in the conductor sections, sources of supply of relatively high and low voltages, transformers connected to said sources for respectively changing the higher voltage to a lower voltage and changing the lower voltage to a higher voltage, means for applying said voltages to the conductor sections, and means for sequentially starting the motors in the conductor sections.

20. In a system for supplying current to a train-line conductor comprising a plurality of sections, one having a source of current supply, coupling means for connecting the train line conductor sections to establish a circuit, motors arranged in said conductor sections, thermally responsive means controlling the supply of current to the motors, and control means for sequentially starting the motors in the conductor sections.

21. In a system for supplying current to a train-line conductor comprising a plurality of sections, coupling means for connecting the train-line conductor sections to establish a circuit, motors arranged in the conductor sections, thermally responsive means for controlling the flow of current to the motors, and automatic means governed by current supply conditions for controlling the current flow to operate the motors in a certain section or sections to the exclusion of motors in one or more other sections.

22. In a system for supplying current to a plurality of train-line conductor sections, coupling members for connecting the conductor sections to establish a train-line circuit, a generator for supplying current to the conductor sections, motors in the conductor sections, thermally responsive means controlling the supply of current to the motors, and control means operating on an overload on the generator for limiting the time period of supply of current to each motor.

23. In a system for supplying current to a plurality of train-line conductor sections, coupling members for connecting the conductor sections to establish a train-line circuit, a generator for supplying current to the conductor sections, motors in the conductor sections, means operating when the conductor sections are coupled for sequentially starting the motors, thermally responsive means controlling the supply of current to the motors, and control means operating on an overload on the generator for limiting the time period of supply of current to each motor.

WILLIAM S. H. HAMILTON.